United States Patent
Weibull et al.

[15] 3,697,598
[45] Oct. 10, 1972

[54] CONTINUOUS PROCESS FOR PREPARING MONOALKANOLAMINES FROM AMMONIA AND ALKYLENE OXIDES

[72] Inventors: Bengt J. G. Weibull, Alfredshem; Leif Urban Folke Thorsell, Örnsköldsvik; Sven-Olof Lindstrom, Domsjöverken, all of Sweden

[73] Assignee: Mo och Aktiebolag, Ornskoldsvik, Sweden

[22] Filed: Aug. 20, 1968

[21] Appl. No.: 754,045

[52] U.S. Cl. ............................................. 260/584
[51] Int. Cl. ........................................... C07c 89/02
[58] Field of Search ............... 260/584, 584 B, 584 C

[56] References Cited

FOREIGN PATENTS OR APPLICATIONS 158,167   3/1957   Sweden

Primary Examiner—Charles B. Parker
Assistant Examiner—Richard L. Raymond
Attorney—Janes & Chapman

[57] ABSTRACT

A continuous process is provided for preparing monoalkanolamines from ammonia and alkylene oxides using a cation exchange resin as a catalyst, recovering and recycling ammonia, which is used in considerable excess. High yields of the monoalkanolamines, exceeding 65 percent and even 90 percent, are obtainable.

9 Claims, 1 Drawing Figure

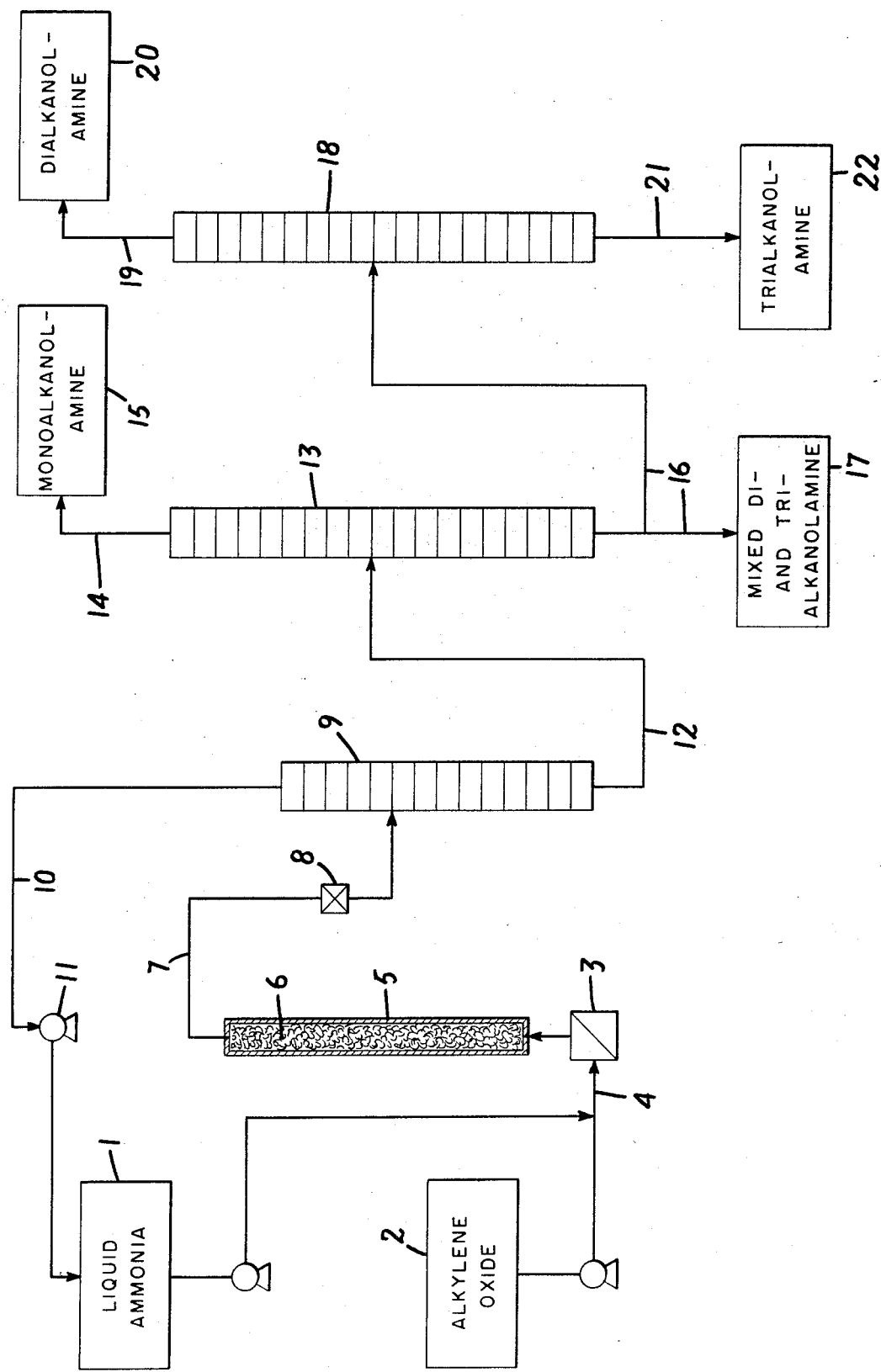

CONTINUOUS PROCESS FOR PREPARING MONOALKANOLAMINES FROM AMMONIA AND ALKYLENE OXIDES

This invention relates to a continuous process for the preparation of monoalkanolamines from ammonia and alkylene oxides in the presence of a cation exchange resin as a catalyst, recycling ammonia recovered at the conclusion of the reaction.

Swedish Pat. No. 158,167, published Mar. 19, 1957, to B. J. G. Weibull, describes the reaction of alkylene oxides and ammonia in an anhydrous reaction system, using as a catalyst organic and inorganic acids, ammonium salts, cation exchange resins saturated with hydrogen or non-quaternary ammonium ions, and anion exchange resins partly or fully saturated with organic or inorganic acids. The reaction can be carried out batchwise or continuously, and a mixture of alkanolamines containing mono-, di- and trialkanolamines is obtained. There is, however, no disclosure by way of example or by way of a process description of a continuous process, and in the examples that are given, the highest yield of monoalkanolamine that is obtained is only slightly more than 60 percent, as shown in FIG. 5.

In accordance with the instant invention a continuous process is provided, in which it is possible to obtain extremely high yields of monoalkanolamines, to the virtual exclusion of di- and trialkanolamines. The process is very economical to operate, because all the alkylene oxide is reacted, and any ammonia that fails to react can be recovered and recycled. Moreover, as a preferred embodiment, the reaction is carried out adiabatically, and once begun will continue, aided by the exothermic heat of reaction that is liberated, which ensures a sufficient rise in temperature to effect a rapid reaction. Unlike the process disclosed in the patent, the continuous reaction of this invention can be carried out in the presence of water, although it is usually not desirable to do so because any water that is present must be removed at the conclusion of the reaction.

In the process of the invention, the reaction of the alkylene oxide and ammonia is carried out under a pressure that is at least as high as the vapor pressure of ammonia at the highest temperature to which the reaction mixture is brought in the course of the reaction, so as to ensure that all the reactants as well as the reaction products are maintained in the liquid phase throughout the reaction. This also is unlike the batch process such as is described in Swedish Pat. No. 158,167, where a gas phase is in fact always present in he closed reaction vessel above the liquid phase.

The process of the invention comprises reacting an alkylene oxide having from two to four carbon atoms with ammonia in the liquid phase in a molar ratio $NH_3$:alkylene oxide within the range from about 10:1 to about 80:1 at a temperature at which the reaction proceeds within the range from about 20° C. to about 250° C. and preferably from about 75° to about 150° C. in the presence of a cation exchange resin in particulate form, to form a reaction mixture composed predominantly of monoalkanolamine and small amounts of di- and trialkanolamines, separating unreacted ammonia and recycling such ammonia, and separating unreacted monoalkanolamine from any di- or trialkanolamines. The di- and trialkanolamines can also be separated, if desired. The process is applicable to any 1,2-alkylene oxide having from two to four carbon atoms, including ethylene oxide, propylene oxide, 1,2-butylene oxide, 2,3-butylene oxide, and isobutylene oxide. These alkylene oxides are all liquids under the pressure necessary to maintain ammonia in the liquid phase under the reaction conditions.

The cation exchange resin catalyst has the advantage that it is insoluble in the reaction mixture. It is therefore possible to establish a fixed bed of particulate catalyst, over or through which the reaction mixture is passed. The rate of flow of the reaction mixture is so adjusted that at the reaction temperature the reaction is essentially complete by the time the reaction mixture has reached the end of the catalyst bed. If the reaction is not quite complete at this stage, it will be complete by the time the mixture is separated into its components, because the continuous reaction is autocatalytic and, once initiated by the catalyst, can be completed in its absence, due to the catalytic action of the alkanolamine product on the reaction of ammonia and alkylene oxide.

The efficiency of the ion exchange catalyst is best expressed in terms of the load, in kilograms of reaction mixture (alkylene oxide + ammonia) per kilogram of catalyst per hour, corresponding to practically complete conversion of the alkylene oxide. In general, the load can be increased as the reaction temperature is increased. At reaction temperatures from about 75° C. to about 150° C. loads of from 3 to 50 kg. per kg. per hour are possible, and loads from 5 to 30 kg. per kg. per hour are preferred. At lower temperatures than 75° C. the load may have to be less than 50 kg. per kg. per hour because of the slower reaction rate, and at higher temperatures above 150° C., the load may be higher than 50 kg. per kg. per hour because of the greater reaction rate. The lower limit of load is not critical, but there is no point in using a lighter load if a heavier is possible, since the result is merely a lower rate of production per unit time. For optimum utilization of the plant equipment, therefore, the temperature of the reaction volume of catalyst and flow rate of reaction mixture through the catalyst are adjusted to give the highest yield of product per unit time. A heavy load also favors production of the monoalkanolamine over the higher di- and trialkanolamines.

The catalyst is usually in the form of a fixed bed. It can also be in the form of a fluidized bed, passed concurrently with or countercurrently to the reaction mixture. A fluidized bed system requires a filter or centrifuge to separate catalyst from the liquid reaction mixture at the end of the reaction.

Cation exchange resins, as is well known, have a synthetic resin base molecule to which are attached the active groups to which the resin owes its cation exchange capacity. These active groups include sulfonic, carboxylic, phenolic hydroxyl, phosphonous, phosphonic, and phosphoric acid groups.

As the base resin molecule, there are usually used polystyrene, copolymers of styrene and divinyl benzene, polymethacrylic acid, polyacrylic acid, phenol-formaldehyde polycondensates, and processed coal. Cation exchange resins that are commercially available include Amberlite IR-120, IR-122, IR-124, XE-100, Dianion SK, Dowex 50 (Nalcite HCR), Dowex 50 W, Duolite C-20, Duolite C-25, Imac C-12, Lewatit S-100, Ionac C-240, (Permutit Q), Permutit RS, Permutit C 50 D, Wofatit KPS 200, Zerolit 225 (Zeo-Karb 225), which are of the sulfonated polystyrene type, or styrene-divinyl benzene copolymer; Amberlyst 15 is also of this type, and is macroreticular; Duolite C-3, Duolite C-10, Ionac C-150 (Zeo-Karb), Lewatit KS, Lewatit KSN, Wofatit K (KS), Wofatit P, Zerolit 215 (Zeo-Karb 215), which are of the sulfonated phenol-formaldehyde type; Amberlite IRC-50 and IRC-84, Amberlite XE-(89 H), Duolite CS-101, Ionac C-270 (Permutit H-70), Lewatit C, Lewatit CNO, Zerolit 226 (X-2.5 and X-4.5), Wofatit C, which are of the polymethacrylic acid and polyacrylic acid carboxylic acid type; and Duolite ES-62, Duolite ES-63, and Duolite ES-65, which are of the phosphonous, phosphonic and phosphoric acid types, respectively.

These cation exchange resins can be used in any particulate form. Beads and granules are available. The highest surface area is preferred.

The reaction of alkylene oxide and liquid ammonia does not proceed at room temperature in the absence of the catalyst or water. It is therefore possible to blend these reactants at room temperature prior to initiating the reaction, and store them for some time before introducing the mixture into the reactor which contains the catalyst. However, since traces of water can start the autocatalytic reaction between alkylene oxide and ammonia, and are difficult to exclude, it is preferable to blend the reactants just prior to contact with the catalyst. For some unknown reason, a higher yield of monoalkanolamines is also obtained in this manner.

The reaction can be carried out under isothermal or adiabatic conditions. Under isothermal conditions the preferred reaction temperatures are from about 75° to about 150° C. Since the reaction is strongly exothermic, it is necessary to withdraw heat from the reaction mixture to keep the temperature approximately constant. This can be done by means of cooling jackets or the like.

It is, however, generally preferable to carry out the reaction under adiabatic or nearly adiabatic conditions. In this case, the reactants are preheated to from 25° to 75° C. before they are introduced into the reactor. Because of the reaction heat evolved, any selected initial reaction temperature is rapidly increased. The maximum reaction temperature may not be obtained until the mixture has reached the end of the catalyst bed. It is not normally necessary to withdraw heat from the reaction mixture so as to impose a maximum temperature on the mixture, but this could be done, if desired. The preferred maximum temperature is about 150° C. The upper limit of the reaction temperature is not critical. However, the higher the reaction temperature, the higher the pressure necessary to maintain the system in the liquid phase. The larger the excess of ammonia, the lower the reaction temperature, because ammonia has the lowest critical temperature of the reactants, 133° C., at the critical pressure, 110 atmospheres. Consequently, the reaction temperature usually will not exceed about 150°C.

At such reaction temperatures, the pressure imposed on the system is within the range from about 40 to about 200 atmospheres. The latter is a practical upper limit, and is, of course, not critical; higher pressures can be used, if needed or desired. In any case, the reaction pressure is at least as high as the vapor pressure of the reaction mixture at the highest reaction temperature encountered in the process.

A large excess of ammonia is used. At molar ratios $NH_3$:alkylene oxide of from about 10:1 to about 40:1, it is possible to obtain yields of monoalkanolamines of at least 65 percent, and in many cases 75 to 90 percent, and higher. At molar ratios in excess of 40:1 the yield levels off, and the yields obtained may not be commensurately higher, besides which the larger amounts of unreacted ammonia present an increasing separation problem. Therefore, although in fact molar ratios of 80:1 and higher can be used, they will not normally be used because they are not economically advantageous.

After conclusion of the reaction, the ammonia is easily separated by reducing the pressure to below that at which the ammonia is in a gaseous phase, so that the ammonia can be separated as a gas, and then recycled. The gaseous recycled ammonia is, of course, repressurized to the liquid phase before blending with more alkylene oxide. It is also possible to distill off the unreacted ammonia under pressure and recycle it as a liquid. The pressure over the alkanolamine mixture is then released.

The alkanolamine reaction mixture is composed predominantly of monoalkanolamine, and can be used as such, if minor amounts of di- and trialkanolamines can be tolerated. If pure monoalkanolamine is desired, it can be separated from the other alkanolamines by fractional distillation. The di- and trialkanolamines can be separated from each other in the same way.

The drawing shows a typical reaction system for use in the invention.

Liquid ammonia is stored under pressure in the reservoir 1, and alkylene oxide is stored in the reservoir 2. The reactants are pumped to the preheater 3 after blending in the feed pipe 4 for leading to the preheater, and are brought to a slightly elevated temperature, say, from about 35° C. to about 75° C. The blend is then fed to the reactor 5. The reactor is an elongated column, which is filled with cation exchange resin catalyst beads 6. The volume of beads provided depends, of course, on the rate of flow and the load, and this in turn is determined by the reaction temperature, so that it will be appreciated that the reactor column need not be filled with catalyst, under some circumstances.

The liquid reaction mixture, which is substantially completely reacted, so that all or nearly all of the alkylene oxide has been converted to alkanolamines, is fed from the top of the column through line 7 to the check valve 8, where it is depressurized to atmospheric pressure, and then fed immediately into the still 9. The ammonia gas escapes at the top in gaseous form, and is recycled via line 10 to the compressor 11, whence the liquid ammonia can be returned to the liquid ammonia reservoir 1.

The alkanolamine reaction product is led from the bottom of the still 9 via line 12 to the fractionating column 13. The lower boiling monoalkanolamine is withdrawn at the top via line 14 and fed into storage tank 15, while the di- and trialkanolamines are withdrawn at the bottom via line 16 to storage 17. These can also be run via line 16 to a second fractionating column 18, if desired, where they can be separated, the dialkanolamine being removed at the top via line 19 to storage 20, and the trialkanolamine being removed at the bottom via line 21 to storage 22.

The following examples in the opinion of the inventors represent preferred embodiments of their invention.

EXAMPLES 1 to 16

In an apparatus similar to that shown in the drawing, a series of continuous runs were made in which propylene oxide or ethylene oxide were reacted with ammonia. A variety of reaction temperatures and pressures were used, with varying ratios of ammonia and alkylene oxide. The cation exchange resin was Dowex 50 X 8, 50–100 mesh, in acid form. It was in use for over 700 hours, and showed no diminution of activity in this time.

The process conditions for 16 typical runs in this system are summarized in Table I. The results show the dependence of the conversion of alkylene oxide to alkanolamines on the catalyst load, the reactant molar ratio, and the reaction temperature for ethylene and propylene oxide. The maximum load for practically complete conversion of ethylene oxide (>99 percent) increases from 10 kg. reaction mixture per kg. catalyst per hour at 100° C. to 38 kg. reaction mixture per kg. catalyst per hour at 140° C. and is independent of the molar ratio between ammonia and alkylene oxide. For propylene oxide the figures are somewhat lower. When the load is increased above these figures, the conversion begins to drop. In a control experiment with the same flow rate of reaction mixture but without catalyst the conversion was only 24 percent.

TABLE I

| Example No. | Alkylene oxide | Reaction temp. °C. | NH₃ Alkylene oxide Molar ratio | Load on catalyst kg/kg hr. | Conversion of alkylene oxide % |
|---|---|---|---|---|---|
| Control* | EO | 100 | 40:1 | — | 24 |
| 1 | EO | 100 | 10:1 | 10 | >99 |
| 2 | EO | 100 | 10:1 | 12 | 99 |
| 3 | EO | 100 | 20:1 | 8 | >99 |
| 4 | EO | 100 | 20:1 | 10 | >99 |
| 5 | EO | 100 | 20:1 | 12 | 99 |
| 6 | EO | 100 | 40:1 | 10 | >99 |
| 7 | EO | 100 | 40:1 | 13 | 98 |
| 8 | EO | 110 | 40:1 | 14 | >99 |
| 9 | EO | 120 | 40:1 | 25 | 99 |
| 10 | EO | 120 | 40:1 | 38 | 90 |
| 11 | EO | 130 | 40:1 | 25 | >99 |
| 12 | EO | 130 | 40:1 | 38 | 95 |
| 13 | EO | 140 | 40:1 | 38 | >99 |
| 14 | EO | 140 | 40:1 | 50 | 95 |
| 15 | PO | 120 | 40:1 | 16 | 99 |
| 16 | PO | 140 | 40:1 | 38 | 95 |

EO = ethylene oxide
PO = propylene oxide
* = no cation exchange catalyst

EXAMPLES 17 to 30

Using a reaction system similar to that of the drawing, and with the same catalyst as in Examples 1 to 16, ammonia was reacted isothermally with ethylene or propylene oxide under the reaction conditions summarized in Table II. The ammonia used contained about 0.2 percent of water. The load on the catalyst was chosen to give practically complete conversion of alkylene oxide.

The data show that at molar ratios from 40:1 to 80:1 it is possible to obtain yields of monoalkanolamines of from 80 to 93 percent, with only very small amounts of trialkanolamines. The yield of monoalkanolamine increases with increasing excess of ammonia, and decreases with increasing reaction temperature. The yield is higher with catalyst than without.

TABLE II

| Ex. No. | Alkylene oxide | NH₃ Alkylene oxide molar ratio | Reaction temp. °C. | Reaction pressure atm. | Reaction product Wt. % MEA | Wt. % DEA | Wt. % TEA |
|---|---|---|---|---|---|---|---|
| Control⁺ | EO | 40:1 | 100 | 100 | 87.5 | 11.7 | 0.8 |
| 17 | EO | 40:1 | 80 | 80 | 89.5 | 9.9 | 0.6 |
| 18 | EO | 40:1 | 100 | 100 | 89.5 | 10.2 | 0.3 |
| 19 | EO | 40:1 | 100 | 100 | 89.4 | 10.1 | 0.5 |
| 20 | EO | 40:1 | 100 | 100 | 89.2 | 10.2 | 0.6 |
| 21 | EO | 40:1 | 100 | 100 | 88.7 | 10.6 | 0.7 |
| 22 | EO | 40:1 | 100 | 100 | 90.0 | 9.6 | 0.4 |
| 23 | EO | 40:1 | 120 | 120 | 85.8 | 12.7 | 1.5 |
| 24 | EO | 40:1 | 140 | 145 | 84.3 | 14.1 | 1.6 |
| 25 | EO | 60:1 | 100 | 100 | 91.9 | 7.7 | 0.4 |
| 26 | EO | 60:1 | 120 | 120 | 90.7 | 8.7 | 0.6 |
| 27 | EO | 60:1 | 140 | 145 | 80.2 | 16.3 | 3.5 |
| 28 | EO | 80:1 | 100 | 100 | 93.3 | 6.4 | 0.3 |
| 29 | EO | 80:1 | 140 | 145 | 88.7 | 10.5 | 0.8 |
| 30 | PO | 40:1 | 100 | 80 | 92.4 | 7.4 | 0.2 |

EO = ethylene oxide
PO = propylene oxide
⁺ = no cation exchange catalyst
MEA = Monoethanolamine
DEA = Diethanolamine
TEA = Triethanolamine

EXAMPLES 31 TO 40

Using a reaction system similar to that of the drawing, and with the same catalyst as in Examples 1 to 30, ethylene oxide and ammonia were reacted adiabatically under the reaction conditions summarized in Table III. The load on the catalyst was chosen to give practically complete conversion of ethylene oxide, as set out in Examples 1 to 16.

The data show that at molar ratios from 11:1 to 44:1 it is possible to obtain yields of monoethanolamine of from 73 to 91 percent, with only very small amounts of triethanolamine. The yield of monoethanolamine is at least at good as in the case of an isothermal reaction; compare Examples 33 and 34 with Examples 17 to 24. Small amounts of water have no influence on the yields. In this case, too, the yield of monoethanolamine increases with increasing excess of ammonia. Comparison with the results of Examples 17 to 29 show that the increase is modest at ratios of ammonia to alkylene oxide above 40:1. Without cation exchange catalyst it is not possible to realize an adiabatic reaction, because it is too slow.

TABLE III

| Ex. No. | water in ammonia % | NH₃ ethylene oxide molar ratio | Reaction temp. °C. | Reaction pressure atm. | Reaction product wt. % MEA | wt. % DEA | wt. % TEA |
|---|---|---|---|---|---|---|---|

| | | | | | | |
|---|---|---|---|---|---|---|
| 31 | 0.2 | 11:1 | 20–120 | 110 | 72.7 | 23.2 4.1 |
| 32 | 0.2 | 21:1 | 45–112 | 110 | 84.2 | 14.7 1.1 |
| 33 | 0.2 | 40:1 | 85–105 | 100 | 90.2 | 9.5 0.3 |
| 34 | 0.2 | 44:1 | 55–110 | 110 | 91.0 | 8.6 0.4 |
| 35 | 2.5 | 16:1 | 45–117 | 110 | 79.8 | 18.1 2.1 |
| 36 | 2.5 | 35:1 | 80–112 | 110 | 88.2 | 11.2 0.6 |
| 37 | 5.0 | 11:1 | 20–120 | 110 | 72.7 | 23.2 4.1 |
| 38 | 5.0 | 39:1 | 65–110 | 110 | 90.5 | 9.0 0.5 |
| 39 | 10.0 | 20:1 | 55–120 | 110 | 83.9 | 14.9 1.2 |
| 40 | 10.0 | 36:1 | 65–110 | 110 | 89.3 | 10.3 0.4 |

MEA = Monoethanolamine
DEA = Diethanolamine
TEA = Triethanolamine

Having regard to the foregoing disclosure, the following is claimed as the inventive and patentable embodiments thereof:

1. A continuous process for preparing monoalkanolamines having from two to four carbon atoms which comprises continuously reacting a flowing stream of an alkylene oxide having from two to four carbon atoms with ammonia in the liquid phase in a molar ratio $NH_3$: alkylene oxide within the range from about 10:1 to about 80:1 at a pressure from about 40 to about 200 atmospheres and at a temperature at which the reaction proceeds within the range from about 20° C. to about 250° C. but below the boiling point of the mixture at the pressure used, in the presence of a cation exchange resin catalyst having a synthetic resin base molecule selected from polystyrene, copolymers of styrene and divinyl benzene, polymethacrylic acid, polyacrylic acid, phenol-formaldehyde polycondensates, and processed coal, to which are attached active cation-exchange groups selected from sulfonic, carboxylic, phenolic, hydroxyl, phosphonous, phosphonic, and phosphoric acid groups, in particulate form, to form a reaction mixture composed predominantly of monoalkanolamine and small amounts of di- and trialkanolamines, separating and recycling continuously unreacted ammonia, and recovering monoalkanolamine.

2. A process according to claim 1, in which the di- and trialkanolamines are also recovered.

3. A process according to claim 1, in which the reaction is carried out adiabatically at from about 25° C. to about 150° C.

4. A process according to claim 1, in which the reaction is carried out isothermally at from about 75° C. to about 150° C.

5. A process according to claim 1, in which the ammonia and alkylene oxide are preheated to from about 35° C. to about 75° C.

6. A process according to claim 1, in which the catalyst is present in a fixed bed through which the stream of reactants is flowed.

7. A process according to claim 1, in which the load on the catalyst is from about 3 to about 50 kg. reaction mixture per kg. catalyst per hour at a reaction temperature from about 70° C. to about 150° C.

8. A process according to claim 1, in which the catalyst is a sulfonated polystyrene or styrene divinyl benzene copolymer cation exchange resin.

9. A process according to claim 1 in which the catalyst is a polymethacrylic acid or polyacrylic acid carboxylic acid cation exchange resin.

* * * * *

UNITED STATES PATENT OFFICE
CERTIFICATE OF CORRECTION

Patent No. __3,697,598__  Dated __October 10, 1972__

Inventor(s) __Bengt J. G. Weibull, Leif Urban Folke Thorsell, Sven-Olof Lindstrom__

It is certified that error appears in the above-identified patent and that said Letters Patent are hereby corrected as shown below:

Face Page : Assignee: "Mo och Aktiebolag" should be --Mo och Domsjö Aktiebolag--

Column 1, line 52 : "he" should be --the--

Column 8, line 25, claim 7 : "70°C" should be --75°C--

Signed and sealed this 27th day of November 1973.

(SEAL)
Attest:

EDWARD M. FLETCHER, JR.
Attesting Officer

RENE D. TEGTMEYER
Acting Commissioner of Patents